(12) United States Patent
Brahmadesam et al.

(10) Patent No.: US 11,741,144 B2
(45) Date of Patent: *Aug. 29, 2023

(54) DIRECT STORAGE LOADING FOR ADDING DATA TO A DATABASE

(71) Applicant: Amazon Technologies, Inc., Seattle, WA (US)

(72) Inventors: Murali Brahmadesam, Tiruchirappalli (IN); Raman Mittal, Seattle, WA (US); Yuri Volobuev, Walnut Creek, CA (US); Li-Che Hsiao, Stanford, CA (US); Punit Rajgaria, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,328

(22) Filed: Aug. 8, 2022

(65) Prior Publication Data
US 2022/0382796 A1  Dec. 1, 2022

Related U.S. Application Data

(63) Continuation of application No. 16/588,974, filed on Sep. 30, 2019, now Pat. No. 11,409,781.

(51) Int. Cl.
| *G06F 16/00* | (2019.01) |
| *G06F 16/35* | (2019.01) |
| *G06F 16/182* | (2019.01) |
| *G06F 16/13* | (2019.01) |
| *G06F 16/31* | (2019.01) |
| *G06F 16/25* | (2019.01) |
| *G06F 16/84* | (2019.01) |

(52) U.S. Cl.
CPC ............ *G06F 16/353* (2019.01); *G06F 16/13* (2019.01); *G06F 16/1827* (2019.01); *G06F 16/254* (2019.01); *G06F 16/316* (2019.01); *G06F 16/86* (2019.01); *G06F 16/258* (2019.01)

(58) Field of Classification Search
CPC .... G06F 16/13; G06F 16/1827; G06F 16/254; G06F 16/258; G06F 16/316; G06F 16/353; G06F 16/86
See application file for complete search history.

(56) References Cited

U.S. PATENT DOCUMENTS

| 7,117,229 | B2 | 10/2006 | Marshall et al. |
| 7,480,644 | B2 | 1/2009 | Bluhm et al. |
| 8,688,622 | B2 | 4/2014 | Willson |
| 2010/0174802 | A1 | 7/2010 | Chan et al. |
| 2013/0159251 | A1 | 6/2013 | Skrenta et al. |
| 2015/0254325 | A1 | 9/2015 | Stringham |
| 2015/0278243 | A1* | 10/2015 | Vincent ................. G06F 16/182 707/634 |

(Continued)

*Primary Examiner* — Diedra McQuitery
(74) *Attorney, Agent, or Firm* — S. Scott Foster; Kowert, Hood, Munyon, Rankin & Goetzel, P.C.

(57) ABSTRACT

Direct storage loading may be used to add data to a database. New data may be added to a database, using nodes different than a database engine to access a database. The addition of the new data may be assigned to different nodes. The nodes may obtain the data and store the data to storage locations according allocated space in the database by the database engine. The new data can then be made available for access at the database engine.

20 Claims, 9 Drawing Sheets

(56) References Cited

U.S. PATENT DOCUMENTS

2017/0091226 A1\* 3/2017 Kharatishvili ...... G06F 16/2228
2018/0232308 A1 8/2018 Kusters et al.
2019/0102408 A1\* 4/2019 Loaiza ................. G06F 16/278
2020/0409594 A1\* 12/2020 Devriendt ............. G06F 3/0604

\* cited by examiner

DIRECT STORAGE LOADING FOR ADDING DATA TO A DATABASE

This application is a continuation of U.S. patent application Ser. No. 16/588,974, filed Sep. 30, 2019, which is hereby incorporated by reference herein in its entirety.

Database systems offer various features of analyzing data. Different types of queries, for instance, can be used to determine behaviors, patterns, trends, states, or other information described in a database. A database, however, can only provide these features for data that is already part of the database. Adding additional data to a database system to obtain these benefits is not without performance costs to the database system. Therefore, techniques that improve the performance of adding data to a database system are highly desirable.

Figure 1:
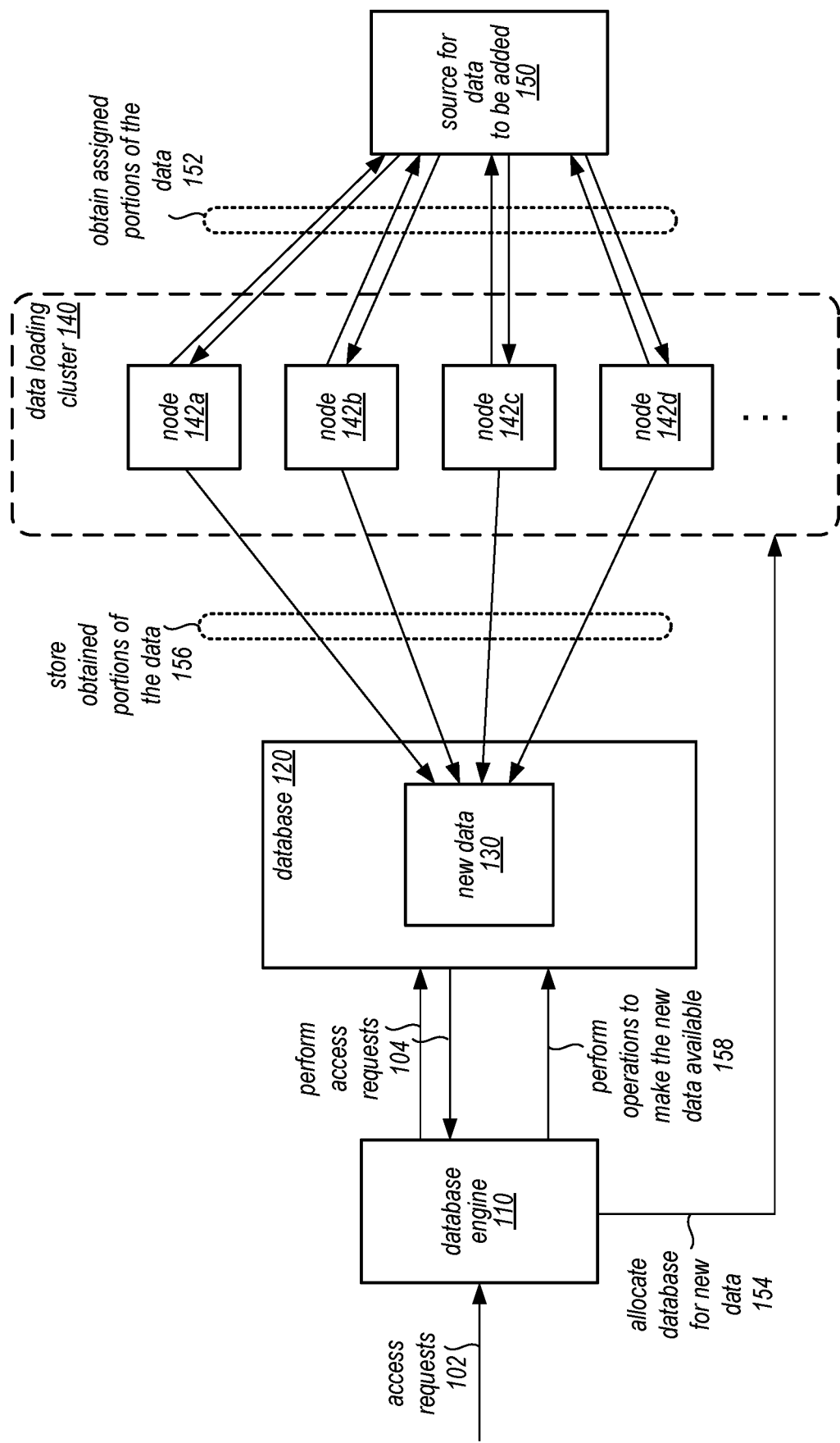
FIG. 1 is a logical block diagram illustrating direct storage loading for adding data to a database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques for direct storage loading for adding data to a database are described. Database systems may add data to a database in various ways. For instance, client applications of a database may perform singleton writes (e.g., structured query language (SQL) "INSERT" statements) or groups of writes (e.g., transactions) to add items, rows, columns, fields, values, or other portions of database data. As such write operations are client application driven, the performance costs of performing such writes are expected by the client application. However, for adding large amounts of data (e.g., one or multiple tables, which may be very large), adding data to the database may consume significant system resources, with great impact on performing other types of workloads (e.g., queries or other writes) for the database submitted by the client application, which may hinder or disrupt the performance of the client application (as well as slow performance of the database system overall.

In various embodiments, direct storage loading for adding data to a database may be implemented, significantly reducing the performance impact of adding data to a database. For example, instead of handling a request to create a new table from a stored copy of the table in another data store directly, a database engine (e.g., a database management system, query engine, and/or storage engine) may offload the work to a group of resources that can obtain the new table from the other data store, reformat or otherwise prepare the table, and then store the table directly, with little or no performance utilization or cost to the database engine. In this way, the database engine can retain computational resources (e.g., network bandwidth, processor capacity, Input/Output (I/O) bandwidth, among others) for performing client application requests. Moreover, operators of database systems do not have to avoid, delay, or schedule adding data to a database at times that are least disruptive to other database workloads (e.g., client application requests). Additionally, utilizing separate resources, such as the data loading clusters discussed below, may allow for performance optimizations, such as parallelization, to increase the speed at which data can be adding. For instance, the time to load a large table into a database could decrease from 1-2 days to 2-3 hours.

FIG. 1 is a logical block diagram illustrating direct storage loading for adding data to a database, according to some embodiments. Database 120 may be data stored in a data storage system, such as storage service 220 in FIG. 2, log-structured storage service in FIG. 3, or other storage system or service (e.g., virtual disk or other block-based storage system, network attached storage, and so on). Database 120 may, in various embodiments, be separately accessible from database engine 110. For instance, the data store for database 120 may implement a storage management application (e.g., data page request processing 361 and data management 365 in FIG. 3) that can process access requests to write to storage locations (or read from them) without direct involvement of database engine 110. In this way, various operations performed to add new data 130 to database 120, such as operations to write different pages of data in an index structure as discussed below with regard to FIGS. 2-7, and 9 can be performed without database engine 110 having to perform as much (or any) of the work.

In various embodiments, database engine 110 may perform access requests 102 to database 120. For instance, database engine 110 may send or issue various requests or commands 104 to a data store for database 120 in order to perform requests to read data, write data, or remove/delete data. Database engine 110 and database 120 may implement different types of database systems, in some embodiments, such as a relational type of database, non-relational type of database, NoSQL type of database, document type of database, graph type of database, among others. Therefore, the supported types of access requests 102, as well as the techniques for performing access requests 104, may vary.

Figure 5:
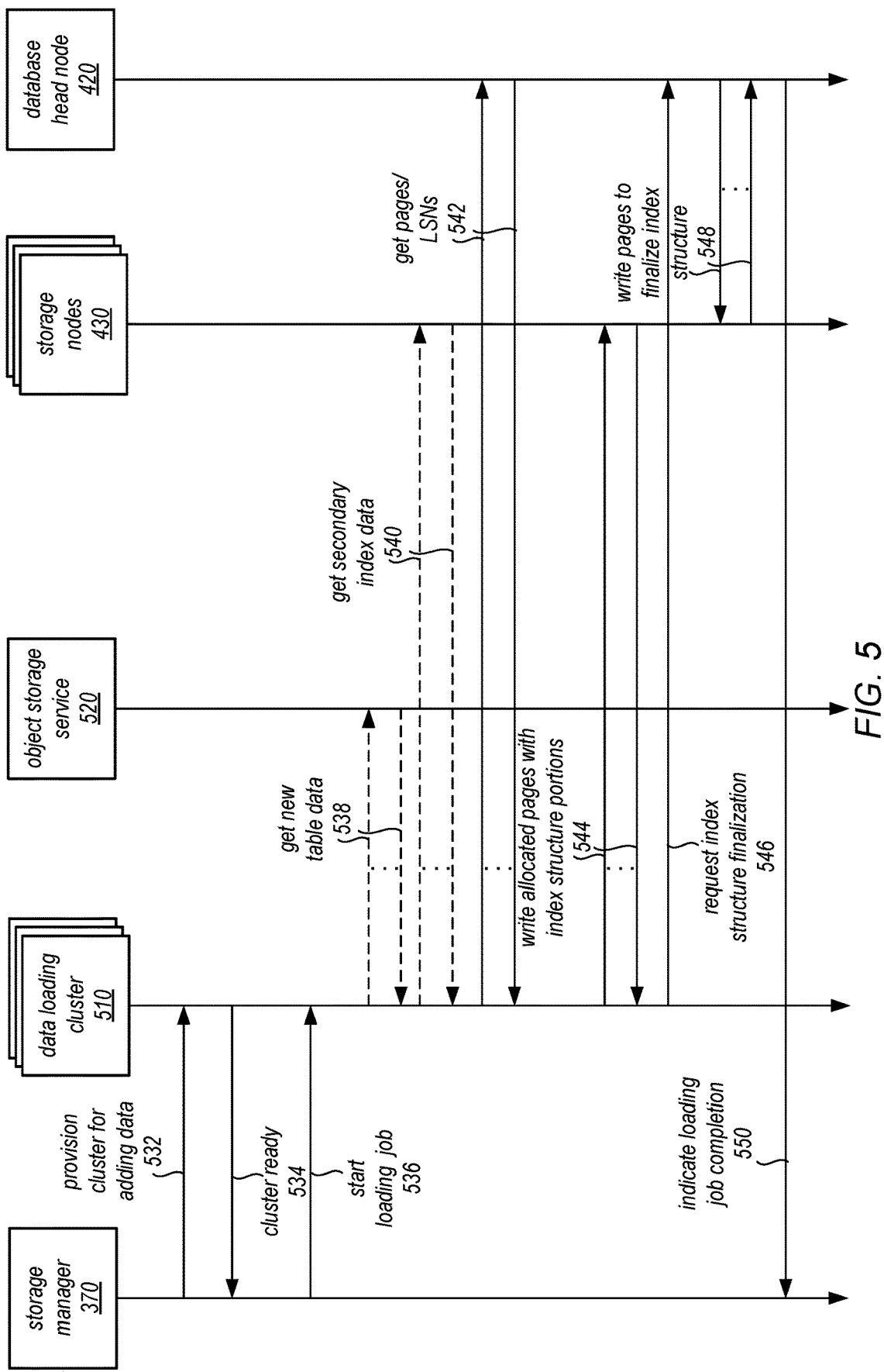
FIG. 5 is a logical block diagram illustrating interactions to distribute adding different portions of data to a database, according to some embodiments.

Data may be added to database 120 in various ways. For example, as indicated in FIGS. 5 and 8, a request to add data may be received (e.g., at database engine 110). To perform the request, resources not implemented by database engine 110 (e.g., at one or more other host computing systems), such as data loading cluster 140, may perform the request to add new data. To add new data 130, the nodes of data loading cluster 140, such as nodes 142a, 142b, 142c, and 142d, may be assigned different portions of the data to obtain and store as part of new data 130 (e.g., as discussed below with regard to FIGS. 5-9). In this way, the work to add the new data 130 may be shared amongst nodes 142 as well as performed in near parallel, increase the speed at which new data is added 130.

Nodes 142 may obtain 152 the assigned portions of the data from the source for data to be added 150. For example, the source may be another data store (e.g., another storage service as discussed below with regard to FIG. 5) or the same data store as storing database 120 (e.g., when adding a new index structure, such as a secondary index, as new data 130). Nodes 142 may perform various transformations upon obtained data, as discussed in detail below. For instance, obtained data may be reformatted from a source format not supported by database engine 110 and database 120, sorted, and/or shuffled to other nodes (according to the assignments). As discussed below, in some embodiments, the new data 130 may be stored as (or as part of) an index structure (e.g., a b-tree), with different nodes or portions of the index structure being written to different data pages (e.g., blocks, ranges of blocks, or other storage device allocations in a data store for database 120).

As indicated at 156, the obtained portions of the data 156 may be stored as new data 130 in database 120. In some embodiments, database engine 110 may provide information to allocate portions of the database 154 for new data 130. For instance, database engine 110 may provide data pages (e.g., by identifier) and logical sequence numbers (LSNs) that are assigned to different portions of new data 130 to nodes 142. In other embodiments—not illustrated—data loading cluster 140 may be able to obtain storage allocations, including data pages allocations, without involving database engine 110. As indicated at 158, database engine 110 may also perform other operations to make the new data available (e.g., update internal database metadata, complete index structure operations, etc.). Although not illustrated, in other embodiments, one or more nodes 142 of data loading cluster 140 may perform the other operations to make the new database available.

Please note, FIG. 1 is provided as a logical illustration and is not intended to be limiting as to the physical arrangement, size, or number of components, or devices to implement such features. For instance, the source for data to be added may be obtained from database 120 (e.g., one or more tables used to create an index) instead of a separate data store.

The specification first describes an example of a provider network that may implement a database service and storage service, according to various embodiments. Included in the description of the example network-based services are techniques for direct storage loading for adding new data to a database. The specification then describes a flowchart of various embodiments of methods for direct storage loading for adding new data to a database. Next, the specification describes an example system that may implement the disclosed techniques. Various examples are provided throughout the specification.

Figure 2:
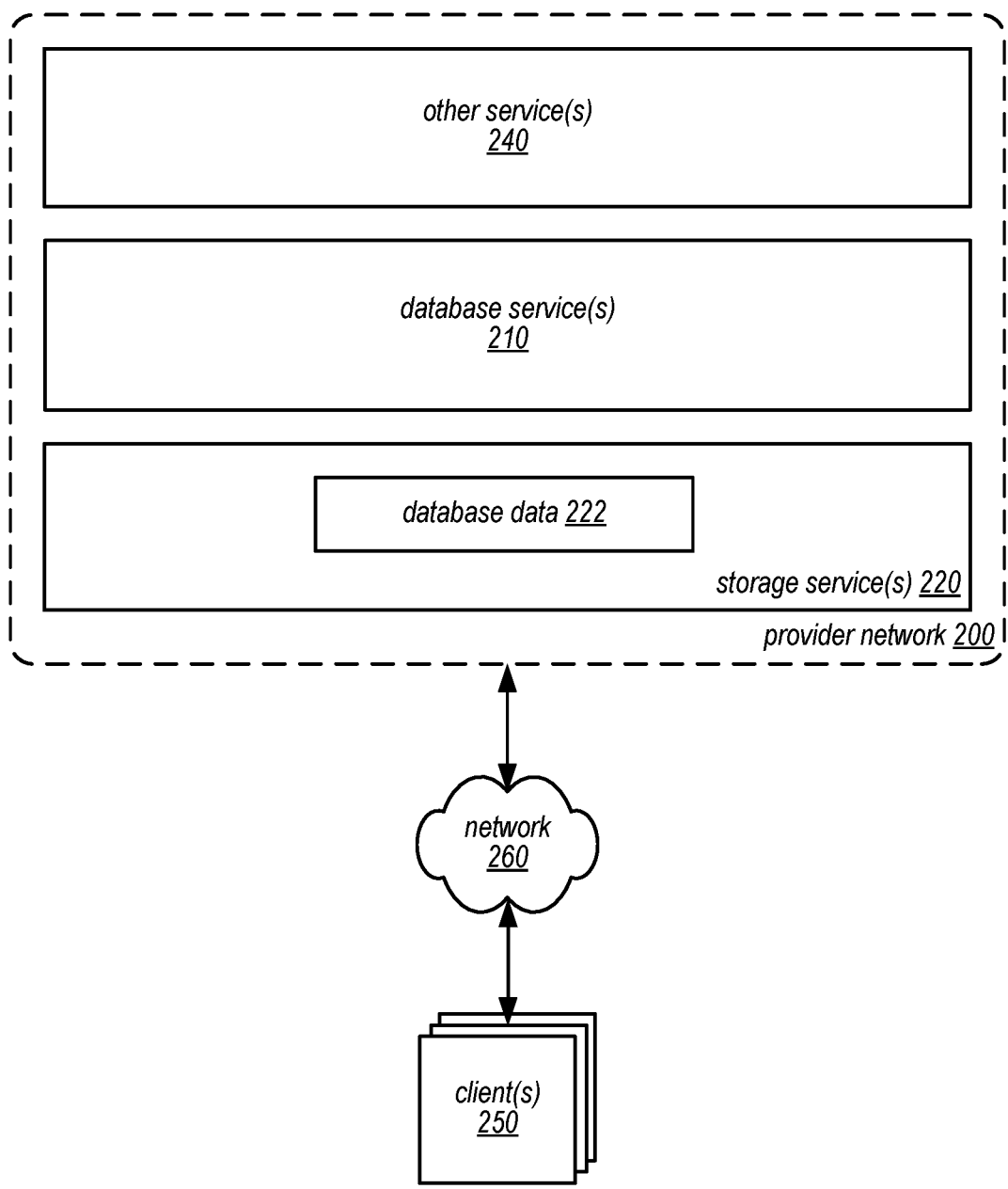
FIG. 2 is a logical block diagram illustrating a provider network that implements a database service and separate storage service that implements direct storage loading for adding data to a database, according to some embodiments.

FIG. 2 is a logical block diagram illustrating a provider network that implements a database service and separate storage service that implements direct storage loading for adding data to a database, according to some embodiments. Provider network 200 may be set up by an entity such as a company or a public sector organization to provide one or more services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200.

In some embodiments, provider network 200 may implement various network-based services, including database service(s) 210, a storage service(s) 220, and/or one or more other virtual computing services 240 (which may include various other types of storage, processing, analysis, communication, event handling, visualization, and security services). Database service(s) 210 may implement various types of database systems and formats (e.g., relational, non-relational, graph, document, time series, etc.) and the respective types of query engines to perform queries to those databases. Storage service(s) 220 may include many different types of data stores, including a log-structured storage service or other storage services, such as object-based storage services, as discussed below with regard to FIGS. 3-5, in some embodiments and may store database data 222 separately from database service(s) 210 (and thus allow database data to be separately accessible from database service(s) 210).

Clients 250 may access these various services offered by provider network 200 via network 260. Likewise network-based services may themselves communicate and/or make use of one another to provide different services. For example, storage service 220 may store database data 222 for databases managed by database service 210, in some embodiments. It is noted that where one or more instances of a given component may exist, reference to that component herein may be made in either the singular or the plural. However, usage of either form is not intended to preclude the other In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to execute a transaction or query with respect to a database, a request to manage a database, such as a request to enable or disable performing queries across different types of query engines, etc.). For example, a given client 250 may include a suitable version of a web browser, or may include a plug-in module or other type of code module that can execute as an extension to or within an execution environment provided by a web browser. Alternatively, a client 250 (e.g., a database service client) may encompass an application, a web server, a media application, an office application or any other application that may make use of provider network 200 to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture. In some embodiments, a client of database service(s) 210 may be implemented within provider network 200 (e.g., on another service 240, such as virtual computing service).

In some embodiments, a client 250 (e.g., a database service client) may provide access to a database hosted in database service 210 to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders, in one embodiment. In such an embodiment, applications may not need to be modified to make use of the storage system service model. Instead, the details of interfacing to provider network 200 may be coordinated by client 250 and the operating system or file system on behalf of applications executing within the operating system environment.

Client(s) 250 may convey network-based services requests (e.g., a request to query a database or perform a transaction at a database) to and receive responses from services implemented as part of provider network 200 via network 260, in some embodiments. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Services within provider network 200 (or provider network 200 itself) may implement one or more service endpoints to receive and process network-based services requests, such as requests to access data pages (or records thereof), in various embodiments. For example, provider network 200 services may include hardware and/or software to implement a particular endpoint, such that an HTTP-based network-based services request directed to that endpoint is properly received and processed, in one embodiment. In one embodiment, provider network 200 services may be implemented as a server system to receive network-based services requests from clients 250 and to forward them to components of a system within database service 210, storage service 220 and/or another virtual computing service 240 for processing.

In some embodiments, provider network 200 (or the services of provider network 200 individually) may implement various user management features. For example, provider network 200 may coordinate the metering and accounting of user usage of network-based services, including storage resources, such as by tracking the identities of requesting clients 250, the number and/or frequency of client requests, the size of data tables (or records thereof) stored or retrieved on behalf of user, overall storage bandwidth used by users or clients 250, class of storage requested by users or clients 250, or any other measurable user or client usage parameter, in one embodiment. In one embodiment, provider network 200 may also implement financial accounting and billing systems, or may maintain a database of usage data that may be queried and processed by external systems for reporting and billing of client usage activity. In some embodiments, provider network 200 may be to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network 200 may also implement user authentication and access control procedures. For example, for a given network-based services request to access a particular database, provider network 200 may implement administrative or request processing components that may ascertain whether the client 250 associated with the request is authorized to access the particular database. Provider network 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, provider network 200 may reject the corresponding network-based services request, for example by returning a response to the requesting client 250 indicating an error condition, in one embodiment. Various access control policies may be stored as records or lists of access control information by database service 210, storage service 220 and/or other virtual computing services 230, in one embodiment.

Figure 3:
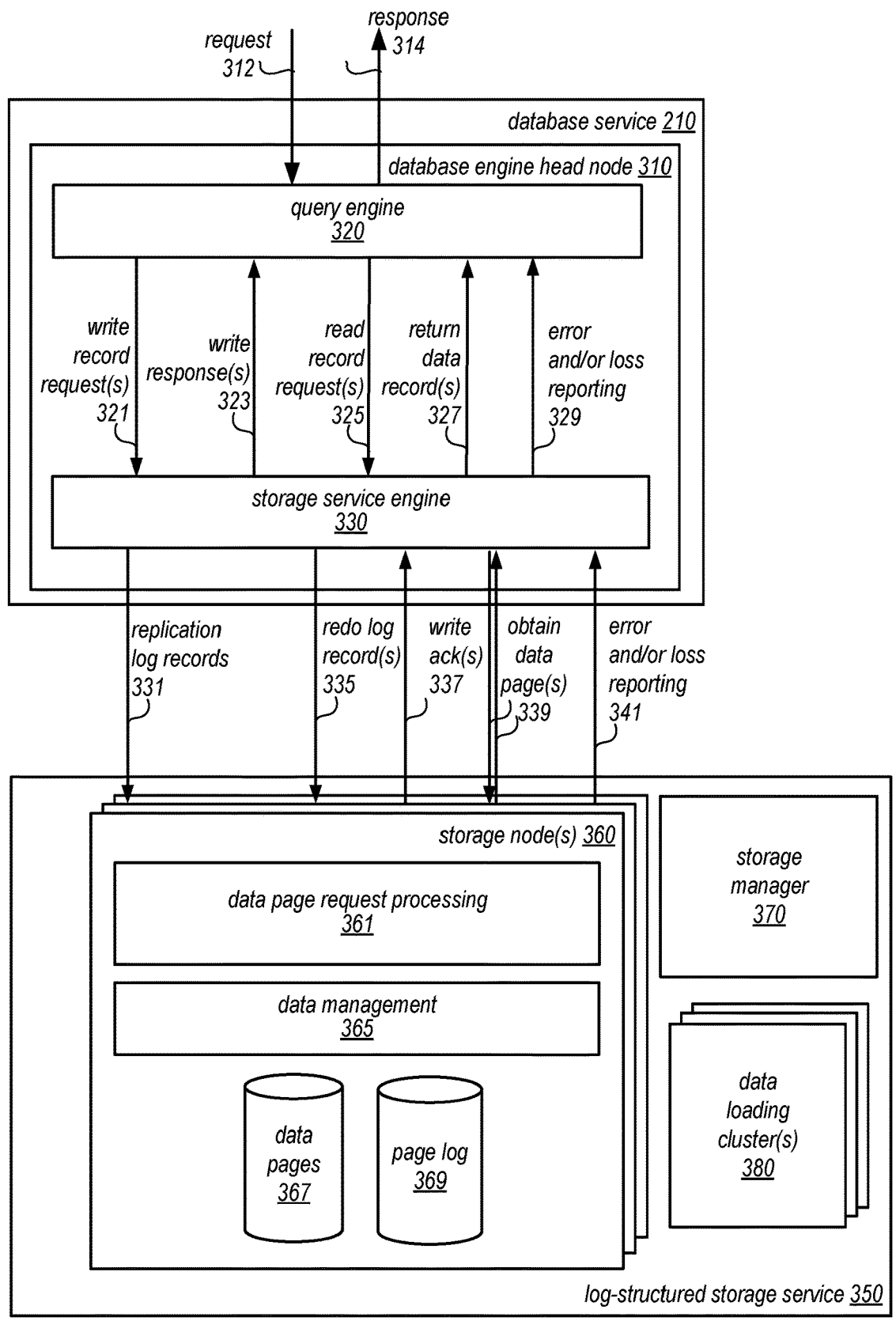
FIG. 3 is a logical block diagram illustrating various components of a database service and separate storage service, according to some embodiments.

FIG. 3 is a logical block diagram illustrating various components of a database service and separate storage service, according to some embodiments. Database service 210 may implement one or more different types of database systems with respective types of query engines for accessing database data as part of the database. In the example database system implemented as part of database service 210, a database engine head node 310 may be implemented for each of several databases and a log-structured storage service 350 (which may or may not be visible to the clients of the database system). Clients of a database may access a database engine head node 310 (which may be implemented in or representative of a database instance) via network utilizing various database access protocols (e.g., Java Database Connectivity (JDBC) or Open Database Connectivity (ODBC)). However, log-structured storage service 350, which may be employed by the database system to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, log-structured storage service 350 may perform various storage, access, change logging, recovery, log record manipulation, and/or space management operations in a manner that is invisible to clients of a database engine head node 310.

As previously noted, a database instance may include a single database engine head node 310 that implements a query engine 320 that receives requests, like request 312, which may include queries or other requests such as updates, deletions, etc., from various client programs (e.g., applications) and/or subscribers (users), then parses them, optimizes them, and develops a plan to carry out the associated database operation(s). Query engine 320 may return a response 314 to the request (e.g., results to a query) to a database client, which may include write acknowledgements, requested data pages (or portions thereof), error messages, and or other responses, as appropriate. As illustrated in this example, database engine head node 310 may also include a storage service engine 330 (or client-side driver), which may route read requests and/or redo log records to various storage nodes within log-structured storage service 350, receive write acknowledgements from log-structured storage service 350, receive requested data pages from log-structured storage service 350, and/or return data pages, error messages, or other responses to query engine 320 (which may, in turn, return them to a database client).

In this example, query engine 320 or another database system management component implemented at database engine head node 310 (not illustrated) may manage a data page cache, in which data pages that were recently accessed may be temporarily held. Query engine 320 may be responsible for providing transactionality and consistency in the database instance of which database engine head node 310 is a component. For example, this component may be responsible for ensuring the Atomicity, Consistency, and Isolation properties of the database instance and the transactions that are directed that the database instance, such as determining a consistent view of the database applicable for a query, applying undo log records to generate prior versions of tuples of a database. Query engine 320 may manage an undo log to track the status of various transactions and roll back any locally cached results of transactions that do not commit.

FIG. 3 illustrates various interactions to perform various requests, like request 312. For example, a request 312 that includes a request to write to a page may be parsed and optimized to generate one or more write record requests 321, which may be sent to storage service engine 330 for subsequent routing to log-structured storage service 350. In this example, storage service engine 330 may generate one or more redo log records 335 corresponding to each write record request 321, and may send them to specific ones of the storage nodes 360 of log-structured storage service 350. Log-structured storage service 350 may return a corresponding write acknowledgement 337 for each redo log record 335 (or batch of redo log records) to database engine head node 310 (specifically to storage service engine 330). Storage service engine 330 may pass these write acknowledgements to query engine 320 (as write responses 323), which may then send corresponding responses (e.g., write acknowledgements) to one or more clients as a response 314.

In another example, a request that is a query may cause data pages to be read and returned to query engine 320 for evaluation and processing or a request to perform query processing at log-structured storage service 350 may be performed. For example, a query could cause one or more read record requests 325, which may be sent to storage service engine 330 for subsequent routing to log-structured storage service 350. In this example, storage service engine 330 may send these requests to specific ones of the storage nodes 360 of log-structured storage service 350, and log-structured storage service 350 may return the requested data pages 339 to database engine head node 310 (specifically to storage service engine 330). Storage service engine 330 may send the returned data pages to query engine 320 as return data records 327, and query engine may then evaluate the content of the data pages in order to determine or generate a result of a query sent as a response 314.

As discussed below with regard to FIGS. 4-7, log-structured storage service 350 may implement features to perform direct loading of data into storage nodes for adding data to databases stored in log-structured storage service 350. For example, log-structured storage service 350 may implement storage manager 370. Storage manager 370 may serve as a control plane for storage node(s) 360 and data loading cluster(s) 380. Storage manager 370 may direct, cause or manage different workflows to implement different features of log-structured storage service 350, such as failure or maintenance operations with respect to storage nodes 360, the creation or addition of new storage volumes for a database, including assigning storage nodes 360 to store data for different databases. As discussed in detail below, storage manager 370 may also manage operations to implement direct storage data loading to add new data to a database at storage node(s) 370 using data loading cluster(s) 380.

In some embodiments, various error and/or data loss messages 341 may be sent from log-structured storage service 350 to database engine head node 310 (specifically to storage service engine 330). These messages may be passed from storage service engine 330 to query engine 320 as error and/or loss reporting messages 329, and then to one or more clients as a response 314.

In some embodiments, the APIs 331-341 of log-structured storage service 350 and the APIs 321-329 of storage service engine 330 may expose the functionality of the log-structured storage service 350 to database engine head node 310 as if database engine head node 310 were a client of log-structured storage service 350. For example, database engine head node 310 (through storage service engine 330) may write redo log records or request data pages through these APIs to perform (or facilitate the performance of) various operations of the database system implemented by the combination of database engine head node 310 and log-structured storage service 350 (e.g., storage, access, change logging, recovery, and/or space management operations).

Note that in various embodiments, the API calls and responses between database engine head node 310 and log-structured storage service 350 (e.g., APIs 321-329) and/or the API calls and responses between storage service engine 330 and query engine 320 (e.g., APIs 331-341) in FIG. 3 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 310 and/or log-structured storage service 350.

In some embodiments, database data for a database of database service 210 may be organized in various logical volumes, segments, and pages for storage on one or more storage nodes 360 of log-structured storage service 350. For example, in some embodiments, each database may be represented by a logical volume, and each logical volume may be segmented over a collection of storage nodes 360. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

As discussed above, log-structured storage service 350 may perform some database system responsibilities, such as the updating of data pages for a database, and in some instances perform some query processing on data. As illustrated in FIG. 3, storage node(s) 360 may implement data page request processing 361, replication log processing 363, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments.

Data page request processing 361 may handle requests to return data pages of records from a database volume, and may perform operations to coalesce redo log records or otherwise generate a data pages to be returned responsive to a request. As discussed below with regard to FIG. 5, in some embodiments, data to be added to a database may be created from data already stored in the database (e.g., to create a secondary index, projection, stored query result, etc.). Data page request processing 362 may handle requests for data from data loading cluster(s) 380 directly, without involving database engine head node 310, in order to obtain data for loading. Data page request processing 361 may also handle requests from data loading cluster(s) 380 to store the data to be added to the database to respective database pages, in some embodiments, as also discussed below.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Figure 4:
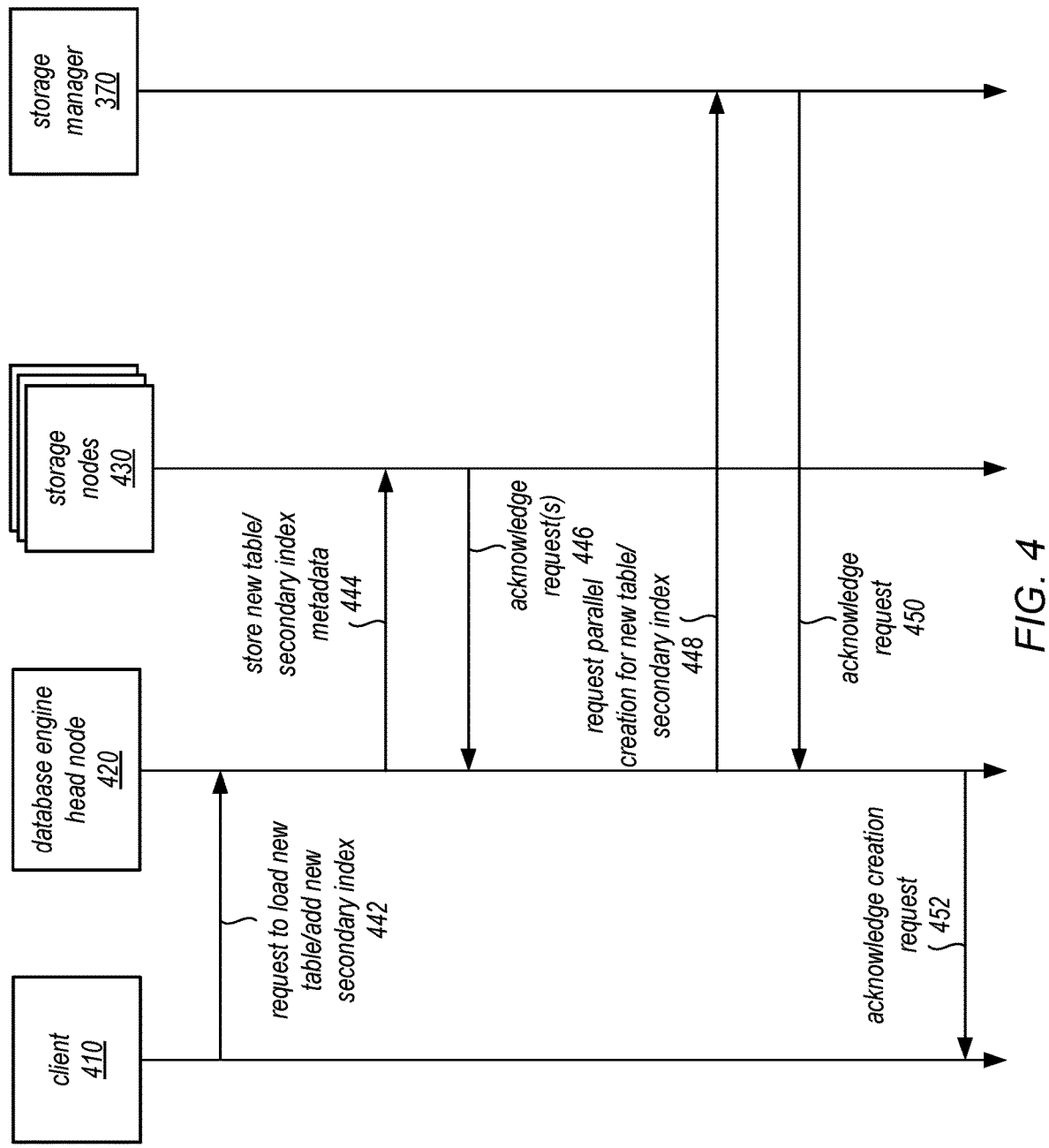
FIG. 4 is a logical block diagram illustrating client interactions to add data to a database using direct storage loading, according to some embodiments.

FIG. 4 is a logical block diagram illustrating client interactions to add data to a database using direct storage loading, according to some embodiments. As discussed above with regard to FIG. 1, loading new data into a database can be triggered in different ways. In one technique, a client 410 (e.g., a client application of a database) can send a request (e.g., via an API) to add the new data utilizing direct loading. For instance, a request 442 may specify a new table to load, a new secondary index (e.g., an alternative index, generated using one or more different key values than a primary index used to access one or more tables to point to rows, records, entries or items in existing table(s) in the database), a projection, or other form of data that can be accessible when stored in the database. Such a request 410 may be specified according to a language (e.g., a SQL request to create a table or secondary index) which may include parameters to indicate use of direct storage loading, as well as the information to complete the request, such a location of the source data for the table (e.g., a file path, object identifier, or other storage location for the data), a format of the source data, a desired transformation or operation upon the data (e.g., combining data columns, changing data type, adding field values such as a timestamp data, etc.), a table name, secondary index feature (e.g., what is the indexing key value), or other information to complete the request. As noted above with regard to FIG. 1, in some embodiments the data to be added may be obtained from multiple different sources and may be joined or otherwise combined when added to the database. In some embodiments, client 410 may submit the request 442 via a console or other administrative interface (e.g., a command line tool) that utilizes an Application Programming Interface (API) for the request.

As illustrated in FIG. 4, the request may be submitted to database engine head node 420, in some embodiments. Database engine head node 420 may be similar to database engine head node 310 in FIG. 3, which may access data stored for a database at multiple storage nodes 430 (of log-structured storage service 350). Database engine head node 420 may update and/or store metadata 444 in storage nodes 430 in order to prepare for and begin allocation of the database for the new table or new secondary index, in some embodiments. For example, database engine head node 420 may perform writes to create an invisible table that will not become marked as available or otherwise visible until loading is complete. Storage node(s) 430 may acknowledge the requests 446 to database engine head node 420.

Database engine head node 420 may then send a request to storage manager 370 to perform a parallel creation for the new table/secondary index as indicated at 448. For example, the request 448 may include information such as the location of the source data, operation parameters, conditions, or inputs to process obtained data, and information for communicating with database engine head node 420 and/or storage nodes 430 in order to complete the creation of the new table or secondary index. Although parallel creation may be performed asynchronously with respect to client 410 and other workloads of database engine head node 420, database engine head node may wait until receiving acknowledgment 450 from storage manager 370 that the request will be performed before providing an acknowledgment of the creation request 452 to client 410, in some embodiments. Client 410 can then perform other operations, without being blocked or otherwise waiting on the new able to be completed (e.g., performing other queries or requests to database engine head node 420).

As noted above, storage manager 370 for log-structured storage service 350 may direct performance of loading new data into a database. FIG. 5 is a logical block diagram illustrating interactions to distribute adding different portions of data to a database, according to some embodiments. Storage manager 370 may provision a cluster for adding a data 532, data loading cluster 510. For example, a pool of clusters usable for different loading jobs may be maintained, and pre-configured to perform loading jobs based on a job request. Storage manager 370 may select or assign one of the available clusters from the pool to be data loading cluster 510, reserving that data loading cluster for a loading job until completed. In some embodiments, data loading clusters may perform more than one loading job as different phases of a loading job may utilize different resources (e.g., network bandwidth, memory, CPU, etc.), so availability and assignment may include considering and/or selecting a data loading clusters with capacity to handle another loading job in addition to a currently executing job (e.g., a job executing at a different job phase, such as transformation instead of obtaining data).

Once a provisioned cluster is ready, an indication of readiness 534 may be sent to store manager 370. Store manager 370 may then send a request or instruction to start a loading job 536 to data loading cluster 510. The loading job may be specified according to an API that supports various parameters or features of a loading job (e.g., source location, source data format, operations to perform, destination information, access credentials, etc.). In some embodiments, the loading job request 536 may be sent as instructions (including programming instructions, such as application code) formatted according to a distributed application framework, such as Apache Spark, or as a compiled application (generated by storage manager 370) to perform the addition of the data and supplied to cluster 510.

Figure 6:
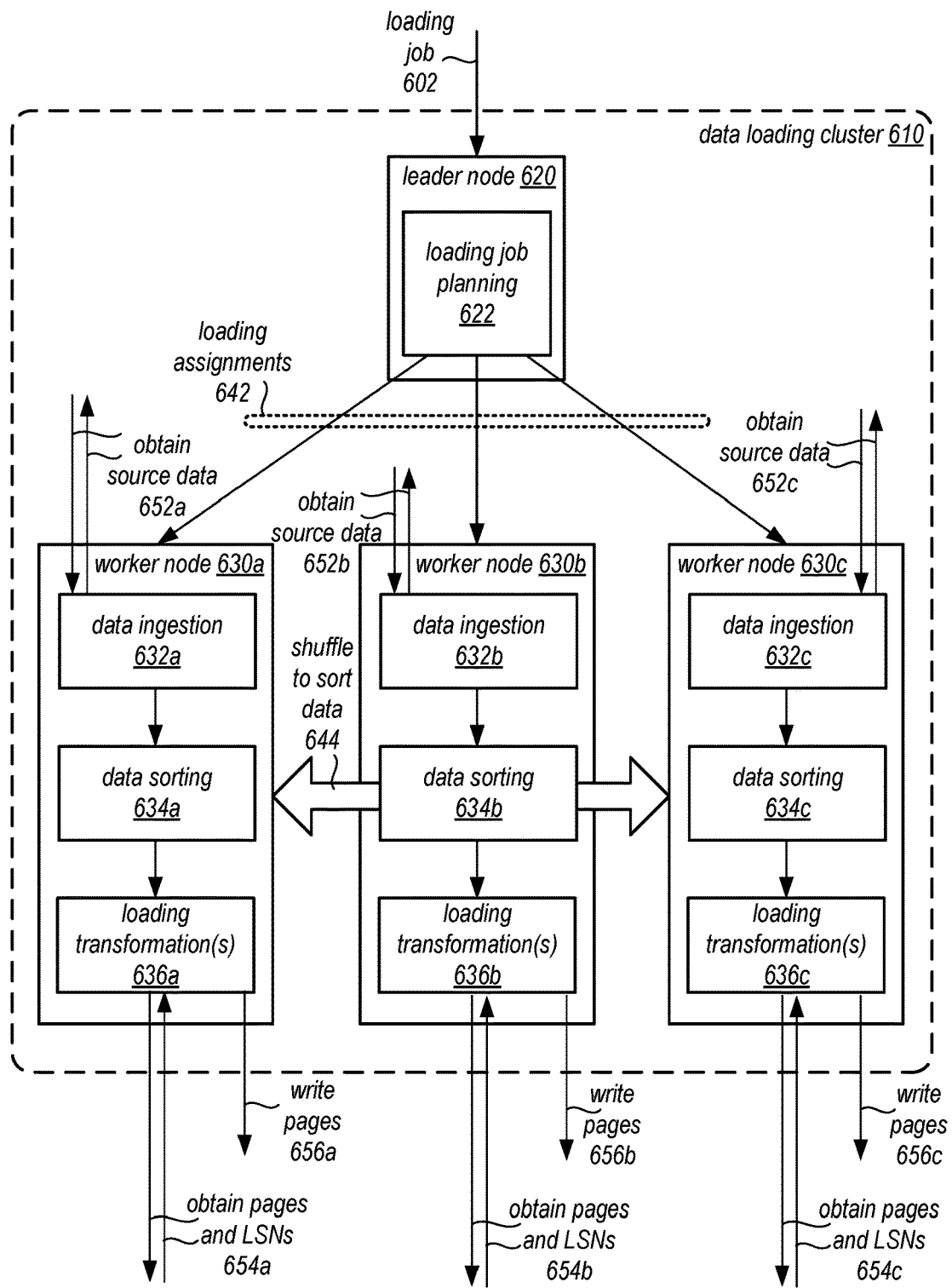
FIG. 6 is a logical block diagram illustrating a data loading cluster, according to some embodiments.

Data loading cluster 510 may begin the loading job, including features of distributing or assigning different portions of the job to different nodes in the cluster, as discussed in detail below with regard to FIGS. 6-7B. Nodes of data loading cluster 510 may then begin sending requests to a source of the data to obtain the data. For example, requests 538 to get data from a file or object in object storage service 520 may be performed to obtain the data to create a new table from a table stored in object storage service 520, in one embodiment. These requests 538 may be formatted according to an interface for accessing the table data in object storage service (e.g., getting files). In another example, data loading cluster 510 may send requests 540 to storage nodes 430 in log-structured storage service 350 to obtain data from existing table(s) in order to add a secondary index. Such requests may include queries or other supported operations to retrieve data from storage nodes 430, in some embodiments.

As database engine head node 420 may manage access to the database, database engine head node 420 may perform various operations to allocate, assign, and/or otherwise logically structure storage for the database. For instance, database engine head node may utilize index structures, such as b-trees, to order or arrange database data. Nodes or other features of such index structures may be allocated according to pages or other schemes at the database engine head node 420 in order to optimize access and processing of requests to the data using the index structures. In order to store data in the database, data loading cluster 510 may have to obtain data page assignments (and corresponding LSNs or other information), in some embodiments.

Data loading cluster 510 may perform the various operations and write the allocated pages with index structure portions (that include data portions) 544 to storage nodes 430 (e.g. write pages that include b-tree internal or leaf node data). When writing of pages 544 is complete, data loading cluster 510 may send a request to database engine head node 420 to finalize and make the new data available. Alternatively, in some embodiments, data loading cluster 510 may send an indication of loading job completion to storage manager 370 which may send the request to database engine head node 420 to make the new data available. Database engine head node 420 may perform one or multiple writes to pages to finalize the index structure 548 (e.g., adding links, adding higher node/parent node pages, etc.) to combine the different portions written to storage nodes 430. Database engine head node 420 may in some embodiments send a completion indication 550 to storage manager 370 (e.g., which may allow data loading cluster to be returned as available to the pool of clusters).

Different types of distributed data processing platforms may be implemented as data loading clusters. FIG. 6 is a logical block diagram illustrating an example data loading cluster, according to some embodiments. Data loading cluster 610 may implement a leader node 620 (or coordinator, lead worker, etc.) and one or more worker nodes, such as worker nodes 630a, 630b, and 630c. Leader node 620 may manage the execution of a loading job sent to data loading cluster 610, such as loading job 602. Leader node 620 may implement load job planning 622, which may parse the loading job request 602 to determine the source data store location(s), destination, operations, and other features of the loading job. Loading job planning 622 may, among other features, distribute or assign different portions of the data to be added according to different schemes, as discussed below with regard to FIGS. 7A and 7B. Leader node 620 can then provide loading assignments 642 to worker nodes 630.

Worker nodes 630 may implement different features to performing assigned portions of a loading job. In some embodiments, worker nodes 630 may implement data ingestion, such as data ingestion 632a, 632b, and 632c. Data ingestion 632 may include various data readers, scanners, parsers, or other interpreters in order to obtain data stored in different formats. Data ingestion 632 may be able to generate and send requests to obtain data, such as requests and responses 652a, 652b, and 652c, according to an interface for the source of the data (e.g., a SQL interface or SOAP interface). Data ingestion 632 may perform pre-processing to transform obtained data into a format interpretable by data sorting features, such as data sorting 634a, 634b, and 634c.

Worker nodes 630 may implement data sorting features 634 to obtain the assigned portions of data provided in loading assignments. For example, worker nodes 630 may each ready different portions of source data (e.g., different files or objects), sort the data into ranges that correspond to different loading assignments and send the data assigned to different worker nodes 630 via a shuffling technique, as indicated at 644. For instance, worker node 630a may send records that belong to a different partition of a new table assigned to worker node 630c to worker node 630c. In this way, each worker node may not have to read or obtain data and then filter out data not assigned to that worker node.

Worker nodes 630 may implement loading transformations, such as loading transformation(s) 636a, 636b, and 636c. Loading transformations 636 may include operations to generate, structure, or otherwise build assigned portions of data into a structure utilized for storing the new data in the database. For example, loading transformations 636 may include various techniques to build portions of an index structure like a b-tree to be generated based on the obtained data, including building pages to represent different nodes of the b-tree, including links to other pages in the built pages. Loading transformations may include, as indicated at 654a, 654b, and 654c, obtaining pages (and LSNs to indicate a version for the page) in order to use the obtained pages for storing transformed data. Other loading transformations may include operations to add, modify, combine, or filter out portions of data (e.g., specified columns) and transform data into a supported data format for the destination database. Worker nodes 630 may write to pages, as indicated at 656a, 656b, and 656c, to store the transformed data, loading that data into the database.

Figure 7A:
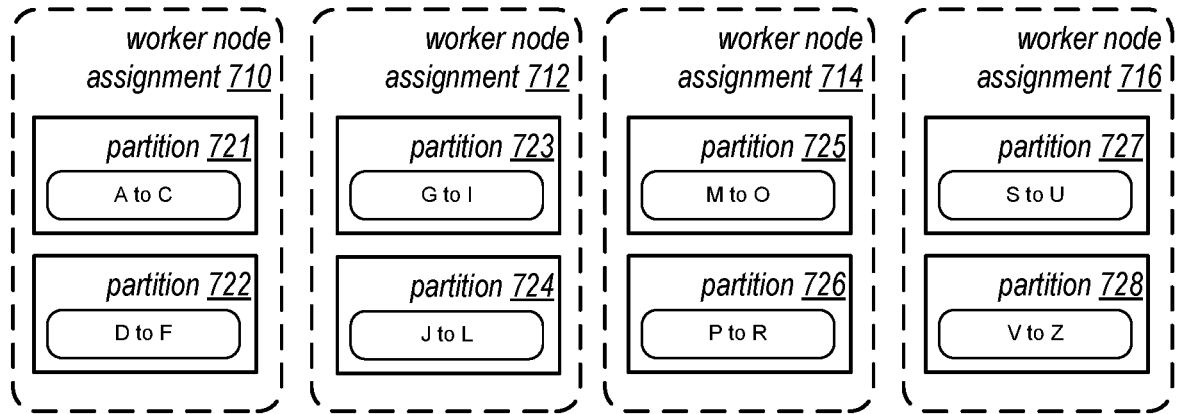
FIGS. 7A and 7B are logical block diagrams illustrating different assignment schemes for distributing loading of data to a database amongst nodes, according to some embodiments.
Figure 7B:
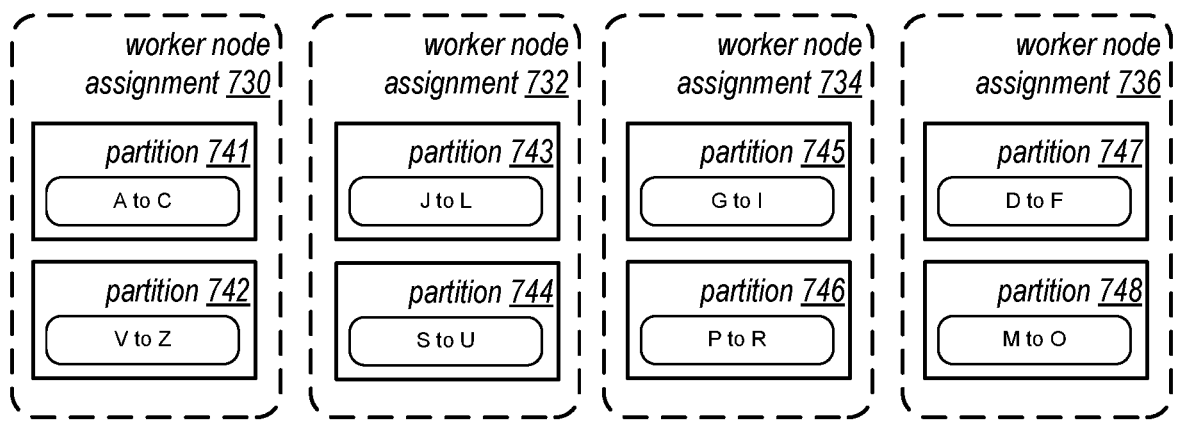
Figure 8:
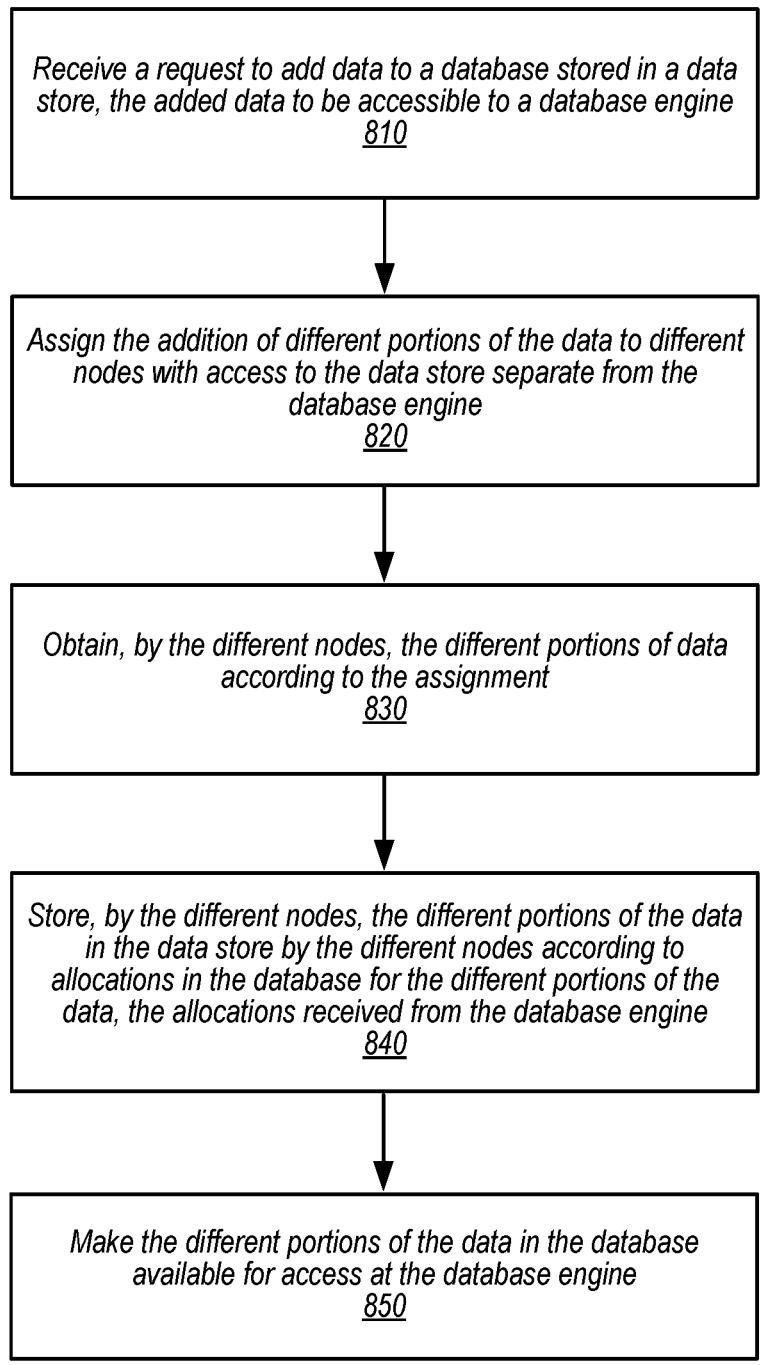
FIG. 8 is a high-level flow chart illustrating methods and techniques for direct storage loading for adding data to a database, according to some embodiments.

FIGS. 7A and 7B are logical block diagrams illustrating different assignment schemes for distributing loading of data to a database amongst nodes, according to some embodiments. In FIG. 7A, an assignment scheme may distribute contiguous portions of data to different worker nodes. For example, worker node 710 may load two different portions, partition 721 and 722. The data within a partition may be sorted and contiguous, such as items A to C in partition 721. The data within the second partition, partition 722, may also be contiguous (e.g., items D to F) and the second partition may be contiguous with the first partition (e.g., partitions 721 and 722 together include a contiguous range of items A to F). Similar assignments may be made to other worker nodes. Worker node assignment 712 may include a partition 723 with contiguous items G to I and partition 724 with contiguous items J to L, which together provide a contiguous range of G to L. Worker node assignment 714 may include a partition 725 with contiguous items M to O and partition 726 with contiguous items P to R, which together provide a contiguous range of M to R. Worker node assignment 716 may include a partition 727 with contiguous items S to U and partition 728 with contiguous items V to Z, which together provide a contiguous range of S to Z.

Assignment schemes are not without costs. For instance, higher amounts of contiguity may have higher data processing costs (e.g., to shuffle data amongst worker nodes). Less contiguous assignment schemes may be implemented. For example, in FIG. 7B, an assignment scheme may randomly distribute portions of data to different worker nodes. For example, worker node 730 may load two different portions, partition 741 and 742. The data within a partition may be sorted and contiguous, such as items A to C in partition 741. The data within the second partition, partition 742, may also be contiguous (e.g., items V to Z), but not contiguous with the first partition 741. Similar assignments may be made to other worker nodes. Worker node assignment 732 may include a partition 743 with contiguous items J to L and partition 744 with contiguous items S to U, which are not together contiguous. Worker node assignment 734 may include a partition 735 with contiguous items G to I and partition 736 with contiguous items P to R, which are not together contiguous. Worker node assignment 736 may include a partition 747 with contiguous items D to F and partition 748 with contiguous items M to 0, which are not together contiguous.

Other combinations of the above (and/or other) assignment schemes may be implemented. For example, contiguous portions of the data can be written together or built into an index structure format (e.g., a b-tree). Thus, a b-tree can be built by a worker node for each contiguous portion of the data resulting in 4 sub-tree in FIG. 7A and 8 sub-trees in FIG. 7B. Another technique may start with randomly located, but sorted and contiguous partitions (e.g., in FIG. 7B). The worker nodes may then send partitions to an assigned node which will have a contiguous range of all partitions at that worker node (e.g., FIG. 7A).

The database service and storage service discussed in FIGS. 2 through 7B provide examples of a system that may perform direct storage loading for adding data to a database. However, various other types of data stores (e.g., non-log structured) or other database systems that provide separate access to database data may implement direct storage loading for adding data to a database. FIG. 8 is a high-level flow chart illustrating methods and techniques for direct storage loading for adding data to a database, according to some embodiments. Various different systems and devices may implement the various methods and techniques described below, either singly or working together. For example, a database engine head node and loading cluster may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 810, a request to add data to a database stored in a data store may be received, in some embodiments. The request may be to add data to be accessible to a database engine in some embodiments. For example, the request may specify the data to be added, the source(s) of the data (e.g., a data store location either in the same data store or a different data store), the destination data format/type (e.g., new table, secondary index, etc.), transformations to apply (e.g., add, modify, combine, join, filter, aggregate, or delete data), and/or credentials to obtain the data from a source data store. In some embodiments, the request may be received from a client application, that utilizes an API, command (e.g., a SQL CREATE table), or other interface. In some embodiments, the request may be received from or triggered by another application that wrote or stored the data to be added, or another application that monitors the source data store. For example, a data stream processor, archive system, backup manager, or Extract Transform Load (ETL) application may send a request to add a table every time one of those example systems stores a file or object for the table in the source data store.

As indicated at 820, the addition of different portions of the data may be assigned to different nodes with access to the data store separate from the database engine, in some embodiments. For example, as discussed above with regard to FIGS. 7A-7B, different assignment schemes for the data may be used that partition the data in different ways, in order to balance the workload of loading the data amongst the different nodes. Assignment schemes may be implemented to maximize loading performance, in some embodiments. For instance, depending on the indexing structure for storing items in the database, the assignment of different items may adjust. A b-tree structure (or other tree structure, such as a b+ tree) may benefit from utilizing a contiguous ranges of data in assignments in order to reduce the complexity of combining sub-portions of the indexing structure together. In embodiments where hash-based indexing is utilized, then assignments may depend upon hash ranges (as opposed to item value ranges), for instance. In some embodiments, the assignment may include obtaining one portion of the data (e.g., a particular data file or path) and loading another portion determined from different items shuffled or sorted amongst the nodes (as discussed above with regard to FIG. 6).

As indicated at 830, the different portions of data may be obtained according to the assignment, in some embodiments. For example, different queries, scan operations, read requests, File Transfer Protocol (FTP) copies, or other techniques to obtain the data to add may be performed by the different nodes. In some embodiments, nodes may obtain data, sort the data, and then shuffle or otherwise redistribute the data amongst the nodes in order to provide data to the node assigned to load that data into the database.

As discussed above, the data may be transformed before storing to the data store of the database, in various embodiments. For example, data stored in one storage format (e.g., comma separated values (CSV)) may be converted to another storage format (e.g., InnoDB), in some embodiments. In some embodiments, data may be modified, removed from the data, or added to the data. In some embodiments, data may written into or incorporated as part of an indexing structure for the database (e.g., tree structure pages, hash index entries, etc.).

As indicated at 840, the different portions of the data may be stored in the data store according to allocations in the database for the different portions received from the database engine. For example, each node may determine a number of data pages of database storage needed to store the portion of data. Each node may send a request to the database engine according to an API that supports allocation of a specified number of data pages (determined from the determined number of data pages). The database engine may coordinate based on all of the page requests for the different portions of the data and assign a number of pages (and corresponding metadata such as LSNs) to each portion, and provide back via the API the page information for that node to use to store the portion of data. In other embodiments, other storage allocation schemes, including utilizing separate storage spaces for added data may be utilized to allow the different nodes to perform allocations in the database.

As indicated at 850, when the different nodes have stored the respective portions in the database the different portions of the data available for access at the database engine, in some embodiments. For example, the database engine may complete an indexing structure (in the data store) to link the different portions of the data (e.g., sub-trees) to create a single indexing structure for the added data. A tree based indexing structure for instance may be combined by a technique where the database engine identifies how to link to together different sub-trees into one tree according to that tree's properties (e.g., according to b-tree properties). Making the data available may also include removing a mark or indication that the table is not visible or committed to the database, in some embodiments. In some embodiments, the different nodes may make the data available for access. A leader node (or other selected node) may perform index structure completions, updates to database metadata to identify the new data as part of the database, and other operations to ready the additional data for access (similar to those discussed above).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 9:
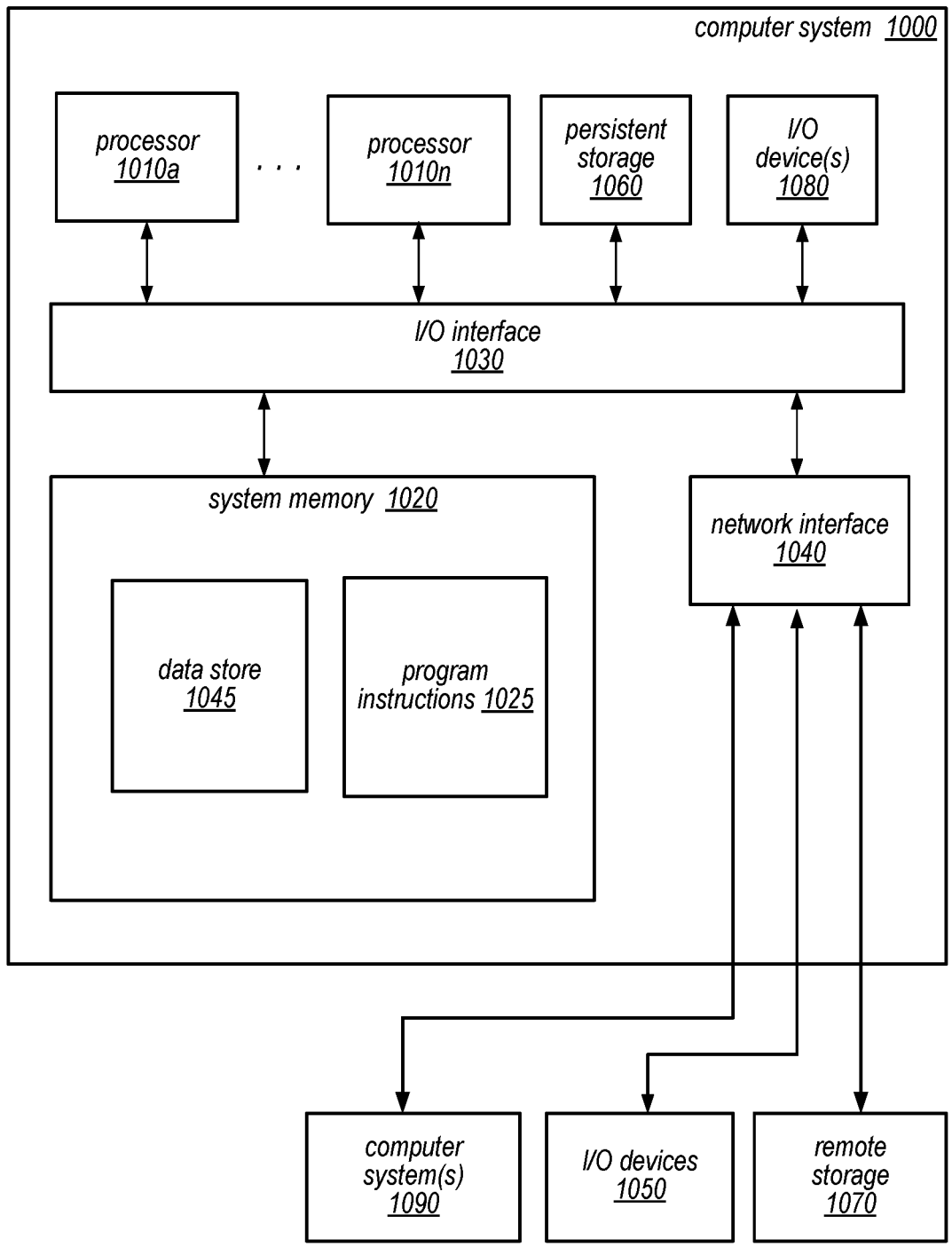
FIG. 9 is a block diagram illustrating a computer system that may implement at least a portion of systems described herein, according to some embodiments.

FIG. 9 is a block diagram illustrating a computer system that may implement at least a portion of the systems and techniques for direct storage loading for adding data to a database described herein, according to various embodiments. For example, computer system 1000 may implement a database engine head node of a database tier, or one of a plurality of storage nodes of a separate distributed storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 660, as desired, and may retrieve the stored instruction and/or data as needed. For example, in some embodiments, computer system 1000 may host a storage node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be implemented as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more processors; and
a memory, that stores program instructions that, when executed by the at least one processor, cause the one or more processors to implement a data loading cluster, comprising a plurality of worker nodes, wherein the data loading cluster is configured to:
receive a request to perform a loading job to add data to a database hosted by a database service offered by a provider network, wherein the database is stored in a data store implemented separately from both a computing node of the database service that implements a database engine to perform requests to access the database and the plurality of computing nodes of the data loading cluster;
execute the loading job, wherein to execute the loading job, the data loading cluster is configured to:
assign different portions of the data to the plurality of worker nodes with access to the data store separate from the database engine;
obtain, by the worker nodes, the different portions of the data to add the data according to the assignment; and
store, by the worker nodes, the different portions of the data in the data store according to allocations in the database for the different portions of the data; and
wherein the different portions of the data in the database are available for access at the database engine after completion of the data loading job.

2. The system of claim 1, wherein the data is obtained from an object storage service of the provider network.

3. The system of claim 1, wherein the data is stored as part of a secondary index implemented for the database.

4. The system of claim 1, wherein to obtain the different portions of the data to add the data according to the assignment, the data loading cluster is configured to:
obtain respective initial portions of the data; and
sort items in the initial portions of the data.

5. The system of claim 1, before the store of the different portions of the data in the data store, modify, by the plurality of worker nodes, the different portions of the data from a first data format supported by a source data store to a second data format supported by the data store.

6. The system of claim 1, before the store of the different portions of the data in the data store, modify, add, or delete, by the plurality of worker nodes, one or more items in the different portions of the data according to one or more transformations determined for the loading job.

7. The system of claim 1, wherein the plurality of worker nodes of the data loading cluster are provisioned for the database in response to a request from a client application received at the database engine.

8. A method, comprising:
receiving, at a data loading cluster comprising a plurality of worker nodes, a request to perform a loading job to add data to a database hosted by a database service offered by a provider network, wherein the database is stored in a data store implemented separately from both a computing node of the database service that implements a database engine to perform requests to access the database and the plurality of worker nodes of the data loading cluster;

executing, by the data loading cluster, the loading job, comprising:
  assigning different portions of the data to the plurality of worker nodes with access to the data store separate from the database engine;
  obtaining the different portions of the data to add the data according to the assigning; and
  storing the different portions of the data in the data store according to allocations in the database for the different portions of the data; and
  wherein the different portions of the data in the database are available for access at the database engine after completion of the data loading job.

9. The method of claim 8, wherein the data is obtained from an object storage service of the provider network.

10. The method of claim 8, wherein the data is stored as part of a secondary index implemented for the database.

11. The method of claim 8, wherein obtaining the different portions of the data to add the data according to the assignment comprises:
  obtaining respective initial portions of the data; and
  sorting items in the initial portions of the data.

12. The method of claim 8, before storing the different portions of the data in the data store, modifying, by the plurality of worker nodes, the different portions of the data from a first data format supported by a source data store to a second data format supported by the data store.

13. The method of claim 8, before storing the different portions of the data in the data store, modifying, adding, or deleting, by the plurality of worker nodes, one or more items in the different portions of the data according to one or more transformations determined for the loading job.

14. The method of claim 8, wherein the plurality of worker nodes of the data loading cluster are provisioned for the database in response to a request from a client application received at the database engine.

15. One or more non-transitory computer-readable storage media storing program instructions that, when executed on or across one or more processors, cause the one or more processors to:
  receiving, at a data loading cluster comprising a plurality of worker nodes, a request to perform a loading job to add data to a database hosted by a database service offered by a provider network, wherein the database is stored in a data store implemented separately from both a computing node of the database service that implements a database engine to perform requests to access the database and the plurality of worker nodes of the data loading cluster;
  executing, by the data loading cluster, the loading job, comprising:
    assigning different portions of the data to the plurality of worker nodes with access to the data store separate from the database engine;
    obtaining the different portions of the data to add the data according to the assigning; and
    storing the different portions of the data in the data store according to allocations in the database for the different portions of the data; and
  wherein the different portions of the data in the database are available for access at the database engine after completion of the data loading job.

16. The one or more non-transitory computer-readable storage media of claim 15, wherein the data is obtained from an object storage service of the provider network.

17. The one or more non-transitory computer-readable storage media of claim 15, wherein, in obtaining the different portions of the data to add the data according to the assignment, the program instructions cause the one or more computing devices to implement:
  obtaining respective initial portions of the data; and
  sorting items in the initial portions of the data.

18. The one or more non-transitory computer-readable storage media of claim 15, before storing the different portions of the data in the data store, modifying, by the plurality of worker nodes, the different portions of the data from a first data format supported by a source data store to a second data format supported by the data store.

19. The one or more non-transitory computer-readable storage media of claim 15, before storing the different portions of the data in the data store, modifying, adding, or deleting, by the plurality of worker nodes, one or more items in the different portions of the data according to one or more transformations determined for the loading job.

20. The one or more non-transitory computer-readable storage media of claim 15, wherein the plurality of worker nodes of the data loading cluster provisioned for the database in response to a request from a client application received at the database engine.

* * * * *